United States Patent [19]
Schmitt

[11] Patent Number: 4,752,396
[45] Date of Patent: Jun. 21, 1988

[54] MULTI-STRAND WOUND FILTER WITH VARIANT CROSS SECTIONAL DENSITY

[75] Inventor: Robert J. Schmitt, Felton, Pa.

[73] Assignee: Brunswick Corporation, Skokie, Ill.

[21] Appl. No.: 785,146

[22] Filed: Oct. 7, 1985

[51] Int. Cl.$^4$ ............................................. B01D 27/04
[52] U.S. Cl. ................. 210/494.1; 210/497.1; 55/486
[58] Field of Search ............ 210/457, 458, 497.01, 210/497.1, 494.1; 242/54.4, 55.1; 55/487, 486; 57/283

[56] References Cited

U.S. PATENT DOCUMENTS

| | | | |
|---|---|---|---|
| 1,279,611 | 9/1918 | Timmins | 210/238 |
| 1,685,390 | 9/1928 | Abbott | 210/232 |
| 1,958,268 | 5/1934 | Goldman | 210/238 |
| 2,368,216 | 1/1945 | Hastings et al. | 210/169 |
| 2,742,160 | 4/1956 | Fogwell | 210/169 |
| 3,027,009 | 3/1962 | Price | 210/236 |
| 3,042,216 | 7/1962 | Goldman | 210/494 |
| 3,151,071 | 9/1964 | Kasten | 210/232 |
| 3,319,793 | 5/1967 | Miller et al. | 210/243 |
| 3,327,864 | 6/1967 | Ball et al. | 210/457 |
| 3,356,226 | 12/1967 | Miller et al. | 210/457 |
| 3,398,904 | 8/1968 | Adams et al. | 242/18 |
| 3,398,905 | 8/1968 | Adams et al. | 242/35.5 |
| 3,471,028 | 10/1969 | Miller et al. | 210/457 |
| 3,624,779 | 11/1971 | Miller et al. | 210/457 |
| 4,225,442 | 9/1980 | Tremblay et al. | 210/497.1 |
| 4,253,228 | 3/1981 | Easley | 29/564.1 |

FOREIGN PATENT DOCUMENTS

| | | |
|---|---|---|
| 683277 | 5/1950 | United Kingdom . |
| 2082466 | 8/1980 | United Kingdom . |
| 2085313 | 9/1980 | United Kingdom . |

OTHER PUBLICATIONS

"The Filterite Cartridge Filtration Guide," 1980; especially pp. 4, 5, 20, 21.

Primary Examiner—Richard V. Fisher
Assistant Examiner—Wanda L. Millard

[57] ABSTRACT

A tubular filter element with a rigid, pervious core on which is wound roving in a criss-cross or diamond pattern to provide a variation in density of the wound roving from the interior portion adjacent the core to the outer surface. The change in density is achieved by varying the number of strands of a multi-strand roving during the winding process. In a preferred embodiment, the roving adjacent the core will be composed of three strands, while the roving of the outer portion will have only one strand.

3 Claims, 2 Drawing Sheets

MULTI-STRAND WOUND FILTER WITH VARIANT CROSS SECTIONAL DENSITY

BACKGROUND OF THE INVENTION

1. Field of the Invention

This inventions relates to filtering devices and, more particularly, to precision wound tubular filters with helically wound layers of yarn, roving, or other windable filter material.

2. Description of the Prior Art

The prior art discloses a wide variety of tubular filter elements with rigid pervious cores on which is wound a plurality of layers of filter media which is generally strands of yarn or roving wound on the core in a specified criss-cross or "diamond" pattern. The diamond-shaped filter media pattern creates passages through the filter media through which the fluid to be filtered flows and in which unwanted contaminating particles are trapped. Often, the fibrous strands of yarn or roving which make up the filter media are napped to enhance their contaminant holding characteristics. U.S. Pat. No. 2,368,216 to Hastings et al., U.S. Pat. No. 3,319,793 to Miller et al., and U.S. Pat. No. 3,624,779 to Miller et al. teach various types of these tubular filter elements. U.S. Pat. No. 3,356,226 to Miller et al., U.S. Pat. Nos. 3,398,904 and 3,398,905 to Adams et al., and U.S. Pat. No. 4,253,228 to Easley teach winding apparatus for applying strands of yarn or roving filter media to cores. Filters such as these are subject to an unwanted excessive pressure drop across the filter which is the result of the outer portions of the filter being blocked by filtered contaminant particles. Usually, the fluid to be filtered flows from the outside to the inside of the filter and then through the filter core and out of the filtering device.

U.S. Pat. No. 3,471,028 to Miller et al. discloses the use of two different filter media on a single core, helically wound yarn on the filter's outer portion and wrapped sheets of filter media on the inner portion. United Kingdom patent application 186,358, filed on Sept. 11, 1980, by Womer discloses a precision helically wound filter cartridge that has a base wind and an outer wind in which the number of diamonds on the surface of each of the winds differs from the number of diamonds on the surface of each of the other winds. This difference is created during the winding by altering the diamond pattern so that the number of circumferential diamonds is decreased or increased and the number of axial diamonds is decreased or increased or a combination of both of these procedures is employed.

Generally, in making a wound tubular filter the core is mounted horizontally on a spindle of a winding machine. The spindle is rotated as a strand of yarn or roving is wound on to the core by the winding machine. Appropriate mechanisms are employed to move the guide which guides the strand back and forth along the length of the spindle as it is rotated so that the strand is applied to the core in a precise pattern. The strand is spirally wrapped around the core one end to the other, e.g., from left to right, as the core rotates and then when the strand reaches the right end of the core the strand is spirally wrapped around the core in the opposite direction, i.e., from right to left. Since the core always rotates in the same direction on the spindle, the strands spirally cross each other and form a diamond pattern.

During winding as additional layers of filter media are wound on to the core in a diamond pattern the diameter of the filter increases and, although the individual diamonds change in size, the number of diamonds as counted circumferentially around the cartridge remains the same. The diamond height stays the same since the length of the filter stays the same, but the length of the diamonds increases as the circumference of the filter increases. Consequently, there is an increase in the area of each diamond.

As shown in FIG. 2 the diamonds in a prior art filter increase in size about the circumference of the filter. Also the diamonds are displaced symetrically so that the diamond centers are not in line radially going out from the core but are located on a curve. FIG. 2 is a cross-sectional view of a wound filter taken perpendicularly to the filter's longitudinal axis. Since there is no straight line through the diamonds to the core, the fluid to be filtered must follow the more circuitous path along the diamond curve thereby increasing the dirt holding capacity of the filter.

As taught by U.S. Pat. No. 3,648,846 to Sicard, the area of the diamond can become too large thereby permitting the flow-through of unwanted contaminant particles to the more interior layers of the filter. This patent proposed a solution to the problem by changing the winding to increase the circumferential number of diamonds in successive winding layers. This procedure is inefficient, time-consuming and labor-expensive.

In an effort to provide a wider range of filtering characteristics, attempts have been made to alter the rate of density change from the interior to the outside filter media wound on a core. These attempts have included actually stopping the winding machine during the winding of a filter to change the winding pattern; this has been accomplished by changing the gearing on the winding machine to alter the wind pattern. Other attempts to provide a stepped "stepped" change in the density of a filter have included the provision of extremely complex machines with independently driven double stepped motors. All of these attempts have either been inefficient, exorbitantly expensive, or both.

SUMMARY OF THE PRESENT INVENTION

According to the present invention a new filter and method for producing it are provided in which the typical prior art winding machines can be used to make a filter unit with desired stepped rate of density change. The method involves changing the number of individual strands of filter material during the winding operation. For example, rather than beginning the winding of filter material around a core with a single strand of material and continuing with a single strand of material throughout the winding as taught by the prior art, this invention teaches the commencement of winding with a multiple number of strands and then, at a desired point during the winding, severing one or more of the plurality of strands at various preselected times during the winding. Of course, it is possible for the present invention to begin the winding with a particular plurality (one or more) of strands and then to add strands as the winding commences. The ability to control the density in particular cross-sectional portions of the filter media layers greatly enhances the ability to design a strong and efficient filter cartridge making it possible to employ only the necessary amount of filter material at a specific location within the filter cartridge. Also, according to the present invention, the nature of the multiple strands of the plurality of strands can either have the same characteristics or they can have different characteristics, giving the filter designer the ability to locate filter media material with different characteristics at different selected cross-sectional locations within the filter cartridge itself.

It is, therefore, an object of the present invention to provide an improved filter with desired stepped change in the rate of density.

Another object of the present invention is the provision of a new method for making such a filter unit.

Yet another object of the present invention is the provision of a method of making a filter unit in which a plurality of strands of filter media material is wound onto a filter core and the integral number of the plurality of strands is changed at preselected locations during the winding operation to either increase or decrease the number of strands as desired.

Still another object of the present invention is the provision of such a filter unit in which all of the strands either have the same physical characteristics or a filter unit in which various strands may have different physical characteristics as desired.

A particular object of the present invention is the provision of such a filter unit having essentially the same contaminant retention capacity as prior art units but which require significantly less filter material.

Another particular object of the present invention is the provision of such a filter unit and method for making it which requires neither the inefficient stopping of the winding process to effect stepped changes in the rate of density nor complex expensive machines to accomplish this.

Other and further objects, features and advantages of the present invention will be apparent from the following description of presently preferred embodiments thereof, given for the purpose of disclosure and taken in conjunction with the accompanying drawings.

DESCRIPTION OF PREFERRED EMBODIMENTS

Figure 1:
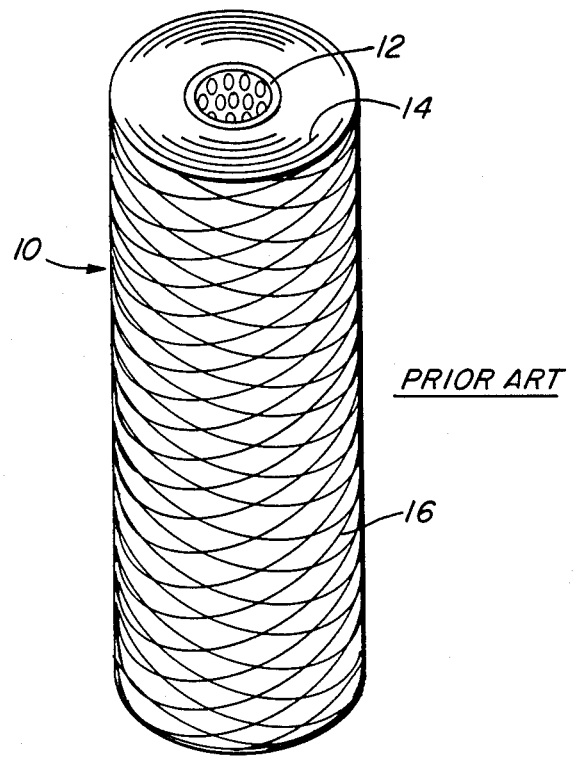
FIG. 1 is a perspective view of a typical prior art wound tubular filter cartridge.

Referring now to the drawings, FIG. 1 depicts a typical prior art wound tubular filter cartridge 10 having a rigid pervious core 12 around which are wound multiple layers 14 of strands 16 of filter material. As shown in FIG. 1, the criss-cross pattern of the winding operation creates a diamond pattern in the layers of the filter material.

Figure 2:
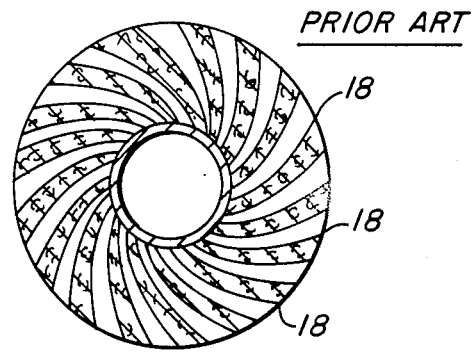
FIG. 2 is a top view in cross section of a typical prior art wound tubular filter cartridge showing the helically extending diamond openings.

The helically outward extending nature of the diamonds formed in the filter material is illustrated in FIG. 2. In prior art cartridges such as depicted in FIG. 2, the size of diamonds continuously and uniformly increases as the diamonds move outwardly from the core of the filter cartridge. There is no abrupt change in the size of any of the diamonds 18.

According to the present invention, the number of strands of filter material is varied during the winding operation without stopping the winding machine. For example, if greater density is desired close to the core of a particular filter cartridge, winding would be commenced with three strands forming a multi-strand filter material to be wound onto the core. As depicted schematically in FIG. 3 after approximately one-third of the total winding cycles needed to produce the filter cartridge, one of the three strands is severed leaving two strands remaining which are further wound onto the cartridge. After approximately two-thirds of the winding cycles have been completed, one of the two remaining strands is severed and the winding is finished with a single strand.

Figure 3:
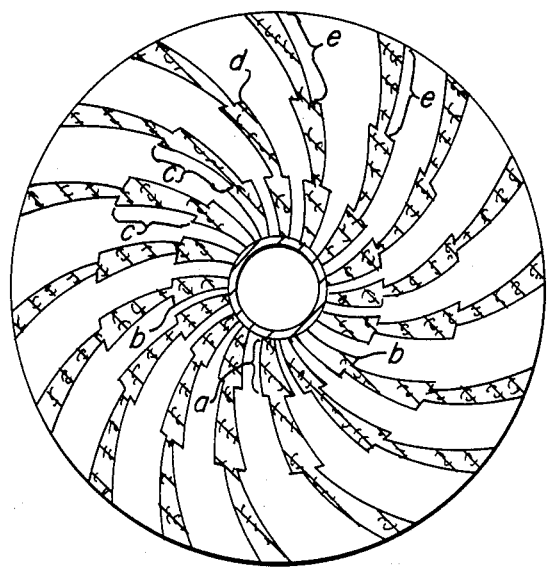
FIG. 3 is a top cross-sectional schematic depiction (not to scale) of one embodiment of a filter cartridge according to the present invention showing the stepped increase in size of the diamond openings.

FIG. 3 depicts the stepped change in the opening through the diamonds of the criss-cross winding pattern. While three strands are being wound, the size of the openings in the "a" layer gradually increases at a constant uniform rate. Point "b" in FIG. 3 shows the point at which one of the three strands is severed. Then, in area "c" the size of the openings in the diamond again gradually increases with a constant uniform rate. At point "d" one of the two remaining strands is severed. And as the winding increases through the area "e" again the size of the opening in the diamonds gradually increases with a constant uniform rate.

Although the example shown in FIG. 3 begins with three strands and is reduced to two and eventually to one, it is within the scope of the invention to begin the winding with any number of strands which the winding machine can handle and it is also within the scope of the invention to decrease the number of strands by any whole number of one or more at any number of desired locations during the winding. Conversely, it is within the scope of this invention to begin the winding with a smaller number of strands and to increase the number of strands without stopping the machine by adding one or more strands at one or more desired locations during the winding operation. The addition of strands to a strand being wound during the winding operation can be accomplished by either (1) stopping the winding machine, entangling a new strand with the strand or strands already being wound, then proceeding with the winding; or (2) by accessing the strand or strands being wound on the core at a point prior to the point at which they are being fed to the winding mechanism and adding the new strand or strands without stopping the winding machine.

Figure 4:
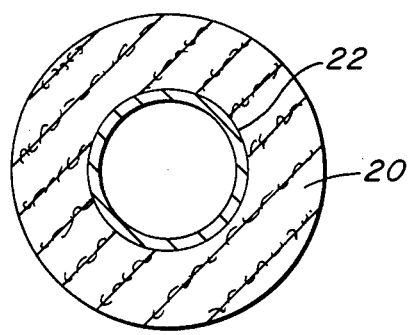
FIGS. 4, 5 and 6 are top schematic depictions (not to scale) of a filter cartridge according to the present invention.
Figure 5:
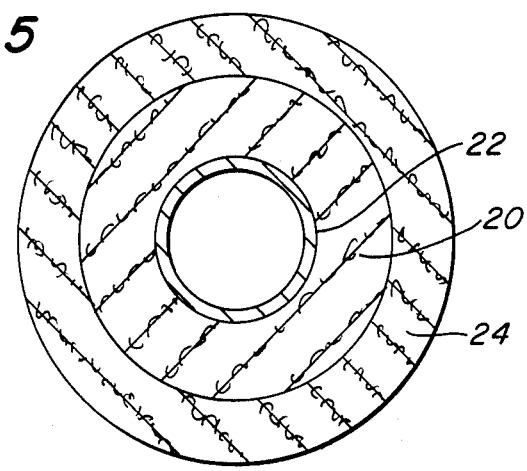
Figure 6:
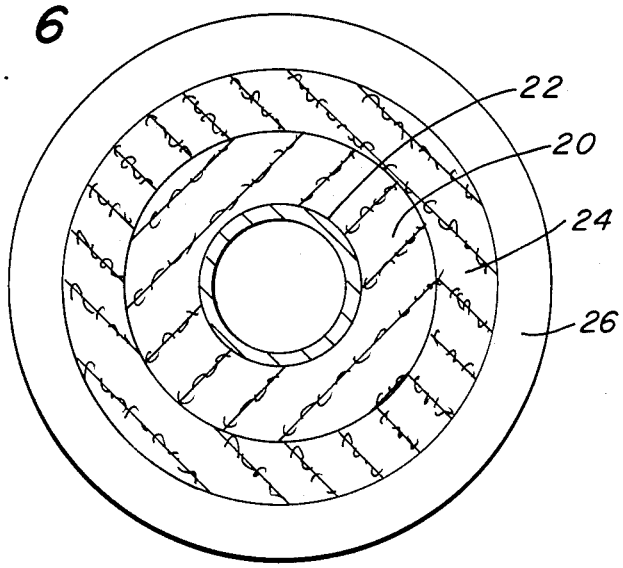

FIGS. 4, 5 and 6 depict schematically the cross section of a filter unit made according to the present invention by beginning with three strands reducing it to two and then reducing it to one. As shown in FIG. 4, the cross-sectional portion 20 which is comprised of three strands of filter media material is wound about the core 22 to a desired depth. One of the three strands is severed, and the winding is continued throughout the cross-sectional portion 24 with two strands of material. Then one of the two remaining strands is severed and the winding is continued with one strand to complete the outer portion 26 of the filter cartridge. Of course, it is within the scope of this invention for all of the plurality of strands to be the same or for various strands in the plurality to have different physical characteristics such as different color, different weight, different nature (natural fiber strands such as wool or cotton or non-natural fiber strands such as dacron, nylon, rayon, or polypropylene), different density, different strength, different amount of twist, or different size.

The following chart presents test data obtained for dimensionally similar filter units. Units A, B, C, and D are prior art units. Unit E is a unit made according to the present invention. Unit E's winding was begun with 3 strands, reduced to 2 strands and then reduced to 1 strand. All units are approximately 10 inches long and 2½ inches in diameter with a pervious rigid core that weighs about 45 grams. The filter media was cotton.

|  | A | B | C | D | E |
|---|---|---|---|---|---|
| Air Test | 6.8" of $H_2O$ | 7.0" of $H_2O$ | 6.0" of $H_2O$ | 6.5" of $H_2O$ | 7.3" of $H_2O$ |
| Weight | 279.0 grams | 282.0 grams | 309.0 grams | 293.0 grams | 220 grams |
| Initial gravimetric eff. | 95.6% | 95.7% | 96.4% | 96.0% | 99+% |
| 90% removal | 1.58 microns | 1.4 microns | 1.68 microns | 1.68 microns | 1.36 microns |
| Life | 21.0 grams | 21.9 grams | 20.7 grams | 21.2 grams | 40.7 grams |

Generally these data show that contaminant holding capacity (40.7 grams with the new filter vs. an average of 21.2 grams with the prior art filter) is almost doubled while removal efficiency is increased (90% of all particles of 1.36 microns or larger were removed with the new filter vs. an average of only 1.57 microns or larger with the prior art units.)

The "Air Test" referred to in the chart above is an air permeability measurement. It shows the overall density of the yarn package product by the winding process. For example, "6.8" of $H_2O$ means that at an air flow of 2 standard cubic feet per minute, the resistance to flow was 6.8" of $H_2O$. The 7.3" of $H_2O$ reading for the new filter is for all practical purposes essentially the same as the 6.58" of $H_2O$ average for the prior art units because the normal acceptance range for filters of this retention performance is 4 to 9" $H_2O$.

The "Life" data listed in the chart in numbers of grams refers to the number of grams of commercially available AC Fine Test Dust delivered to the filter before reaching a terminal pressure change of 35 PSID.

The "Initial Gravimetric Efficiency" refers to initial removal efficiency of the filter element in terms of removal by weight of AC Fine Dust.

The present invention, therefore, is well suited and adapted to attain the objects and ends and has the advantages and features mentioned as well as others inherent therein. While the presently-preferred embodiments of the invention have been given for the purposes of disclosure, various changes may be made therein which are within the spirit of the invention as defined by the scope of the following claims.

What is claimed is:

1. In a filter for fluid filtration comprising pervious core means, multi-strand filter material wound on the core means in a diamond pattern and there exists a change in density of the wound filter material along the cross-sectional thereof,
    the improvement in which such change in density results from a variation in the number of strands of the multistrand filter material for said different cross-sectional portions, whereby one cross-sectional portion is composed of "n" strands of filter material and at least one other section is composed of "a" strands of filter material, "n" and "a" being integers and "n" being greater than "a".

2. The filter of claim 1, in which the innermost cross-sectional portion is composed of "n" strands and the outermost cross-sectional portion is composed of "a" strands.

3. The filter of claim 1, in which "n"=3 and "a"=1.

* * * * *